United States Patent [19]

Forslund

[11] Patent Number: 4,655,341

[45] Date of Patent: Apr. 7, 1987

[54] TRANSFER DEVICE

[75] Inventor: Sven E. Forslund, Ingarö, Sweden

[73] Assignee: PLM AB, Malmo, Sweden

[21] Appl. No.: 721,314

[22] Filed: Apr. 9, 1985

Related U.S. Application Data

[63] Continuation of Ser. No. 378,384, May 14, 1982, abandoned.

[51] Int. Cl.$^4$ .............................................. B65G 27/34
[52] U.S. Cl. .................................... 198/771; 198/442; 222/200
[58] Field of Search .............. 222/199, 442, 565, 200; 198/565, 772, 771, 750, 752, 442

[56] References Cited

U.S. PATENT DOCUMENTS

| | | | |
|---|---|---|---|
| 3,278,090 | 3/1965 | Wahl | 222/199 |
| 4,266,691 | 5/1981 | Wolwowicz | 222/199 X |
| 4,457,840 | 7/1984 | Nagl | 198/771 X |

FOREIGN PATENT DOCUMENTS

| | | | |
|---|---|---|---|
| 0044218 | 6/1931 | Denmark . | |
| 850569 | 7/1949 | Fed. Rep. of Germany | 198/771 |
| 1951541 | 11/1977 | Fed. Rep. of Germany | 198/771 |
| 0303973 | 9/1968 | Sweden . | |
| 1242892 | 8/1971 | United Kingdom . | |

Primary Examiner—Robert J. Spar
Assistant Examiner—Lyle Kimms
Attorney, Agent, or Firm—Roberts, Spiecens & Cohen

[57] ABSTRACT

A device for supplying a mixture of pieces of material or fragments of different materials and sizes to one or more receiving units wherein the mixture is supplied to the device within a relatively limited area from where it is distributed to the receiving units so that each of them receives a substantially uniform layer of the mixture at the same time as it is spread out over a wide area. The device comprises one or more vibrating troughs each with a supporting surface at the receiving end and a protuberance centrally mounted in the trough from which the material is spread over the supporting surface (15) during the formation of a uniformly thick layer of material which is carried along the supporting surface to the discharge end of each vibrating trough where it is discharged.

19 Claims, 12 Drawing Figures

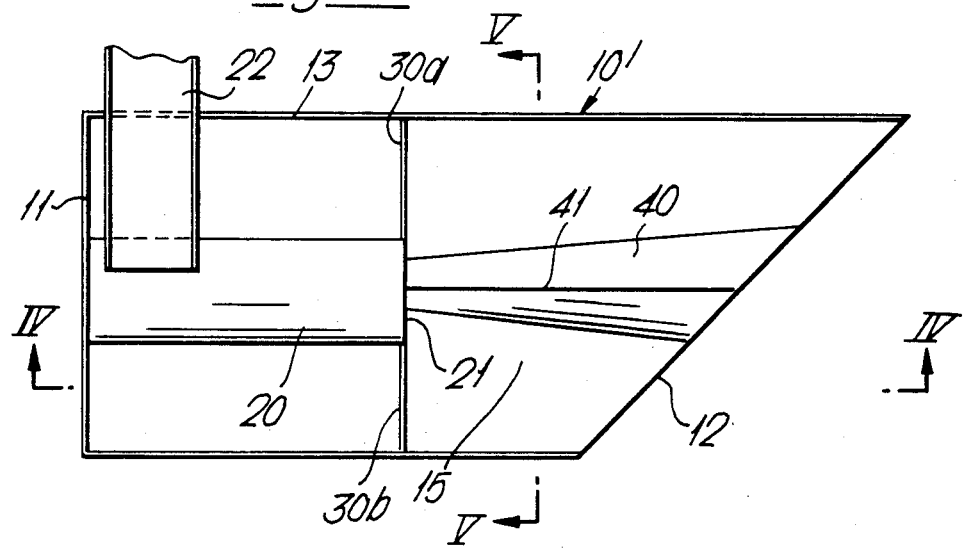
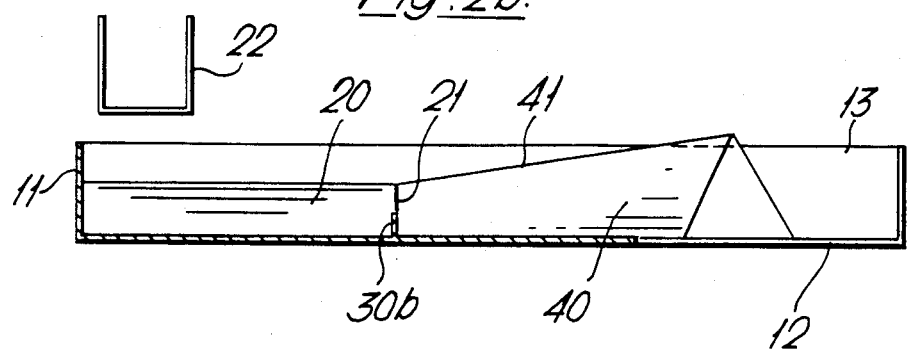
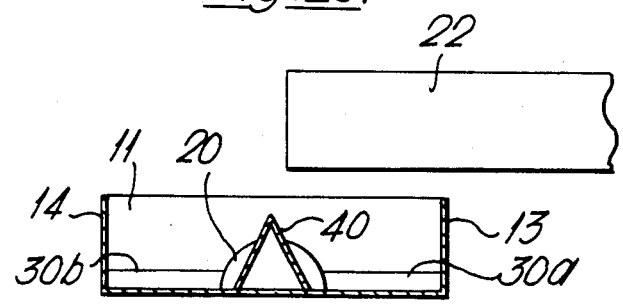

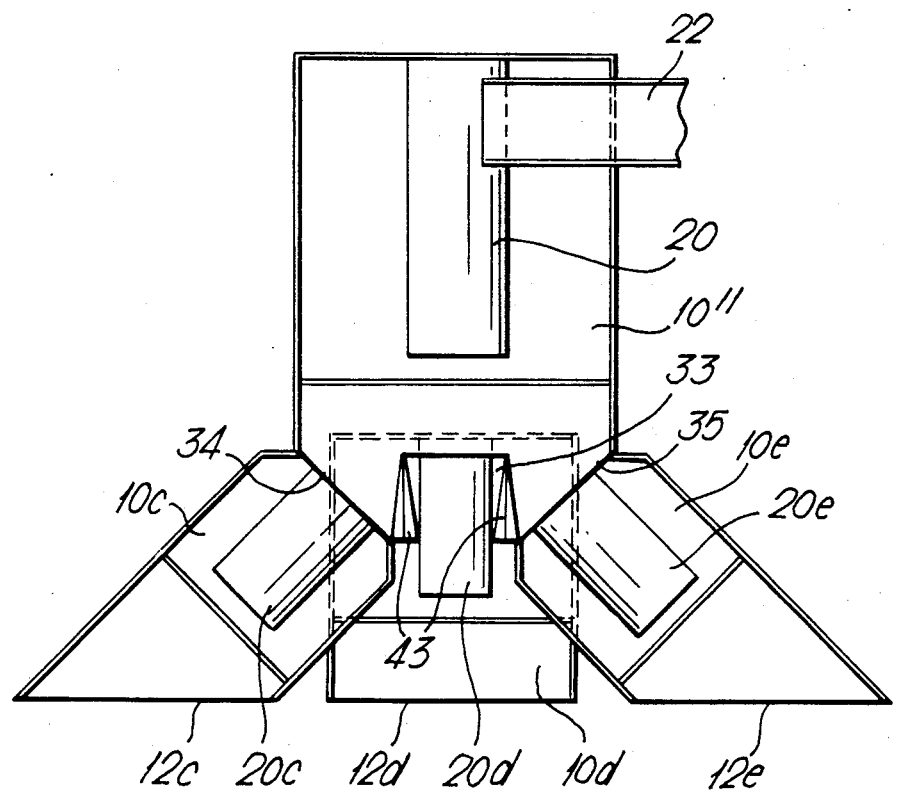

TRANSFER DEVICE

This is a continuation of co-pending application Ser. No. 378,384 filed on May 14, 1982, now abandoned.

FIELD OF THE INVENTION

The invention relates to a device for supplying a mixture of pieces of material or fragments of different materials and sizes to one or more receiving units, whereby the mixture is supplied to the device within a relatively limited area from where it is distributed to the receiving units so that they receive a largely uniform layer of the mixture at the same time as it is spread out over a wide area.

BACKGROUND

When handling products consisting of a mixture of pieces of material or fragments of different materials there exists a need to subdivide the mixture into a number of fractions, each containing only certain definite types of materials. Examples of mixtures which require subdividing are fresh-cut peat (mixed with soil, stones, sticks and twigs) and refuse (usually household refuse). There are of course many other mixtures where a corresponding need exists.

According to an applied alternative for handling refuse, the refuse is first ground down in mills and then sorted into a number of fractions in mechanical separation plants. In a similar manner, peat is separated from irrelevant materials (soil, stones, sticks and twigs).

For reliable operation of the plants it is necessary for the mixture to be supplied to them in a uniformly thick layer of a certain maximum thickness and of a relatively large width.

In addition, the thickness of the layer and its flow rate must be relatively independent of time. Achieving a layer with the above-mentioned properties has so far been fraught with problems.

The reason for the difficulties mentioned is that mixtures of the type mentioned above consist of articles of different density, different elasticity, irregular shape, a certain degree of adhesion, and of varying moisture content. When carrying refuse, for example, on conveyors or in conveying troughs it has a tendency to form a stringy substance which has an adverse effect on the separation plant used. Further, it is not economically feasible to design the transport devices so that the refuse, when conveyed by them, is already in the thin layers required by the subsequent separation plant. There is consequently a need for equipment which spreads the stringy substance on the transport devices in a wide and uniformly thick layer which is supplied to the separation plant along its entire width.

Another problem associated with equipment used at present is that the flow rate of the mixtures varies. In the case of refuse, for example, this is due to uneven discharge from the mill. Such variations in the flow reduce the capacity of the subsequent separation plant. There is accordingly also a need for devices which equalize such variations.

For optimum operation of the separation plant it is, as a rule, necessary for the distribution of the different types of materials to be largely the same for all of the mixture supplied to the plant.

A solution which partially solves the problem of achieving a uniformly thick layer of material is known. This solution consists of vibrating troughs fitted with a number of relatively low plough-like protrusions situated one after the other with their points facing the direction of transporation. Through the agency of the protrusions the material is spread out towards the sides of the vibrating trough. A serious disadvantage of this solution is that the protrusions act as obstructions, whereby the transport capacity of the vibrating trough is reduced at the same time as an undesirable division of the material occurs.

SUMMARY OF THE INVENTION

The present invention provides a device in which the above requirements of uniform distribution of the material are satisfied so that it forms a layer of the necessary width and correct thickness while at the same time the requirement of high transport capacity with unaltered distribution of material in the layer is also satisfied. Practical tests have shown a twofold increase of transport capacity as compared with the known solution.

According to the invention an "artificial" pile of material is arranged in the feed section of the trough conveyor in that the feed section is provided with a protuberance to which the material is carried. This protuberance forms the core of a pile of material down the sides of which the material slides and is thereby spread over the surface of the vibrating trough right out to its sides. The boundaries of the protuberance thereby constitute supporting surfaces for a layer of material the top stratum of which slides against the underlying strata. A certain degree of material transfer naturally also takes place in the lowest strata but the main flow of material takes place in the upper strata. The "artificial" pile of material has less mass than a "homogeneous" pile of material would have while at the same time it can be given a shape which permits the simplest mechanical construction together with the best spreading effect. The small mass of the pile naturally also simplifies the design of drive units and linkage systems for the vibrating trough since the smaller mass forces involved allow the construction of less massive structures. By adapting the amplitude and frequency of the motion of the vibrating trough to the properties of the material, good spreading of the material over the surface of the vibrating trough is obtained.

According to the invention, the vibrating trough is arranged at its feed end with a protuberance preferably located centrally in the trough. The protuberance is of ridge-like shape and extends principally from the edge of the feed end partway along the vibrating trough in the direction of movement of the material. The bounding surface of the protuberance joins the mainly flat supporting surface of the vibrating trough besides which the cross-section of the protuberance is bounded by a curved line, preferably part of the circumference of a circle, which is largely similar to the cross-section of a pile of material. In a preferred version, the protuberance is terminated in the direction of movement of the material by a mainly vertically oriented surface. At the aforementioned surface, preferably slightly after it in the direction of movement of the material, the supporting surface of the vibrating trough is fitted with a number of relatively low protrusions oriented substantially at right angles to the direction of movement of the material. In certain applications only two protrusions are arranged, each extending from the protuberance to one of the two longitudinal sides of the vibrating trough respectively. Situated some distance away from the protuberance, preferably a single protrusion is arranged to extend between the two aforementioned sides of the vibrating trough. The height of the protrusion is a maximum of about 1/5 of the height of the protuberance.

Arranged at the feed end of the vibrating trough against the raised edge of the vibrating trough at this end is, for certain embodiments of the invention, a sloping surface, preferably a curved such surface and preferably concave as viewed from above, to prevent the material from accumulating at the aforementioned edge. This surface accordingly helps to reduce the mass forces occurring as a result of the motion of the vibrating trough.

As mentioned above, it is required in certain applications for the mixture to be divided into a number of separate flows so that the respective layer of material will be of the thickness and the width to ensure reliable operation of the subsequent equipment, such as a separation plant. In these embodiments the vibrating trough is, for certain applications, fitted with a wedge-shaped part which comprises a continuation of the protuberance in the direction of feed. The upper edge of the wedge-shaped part connects to the highest portion of the protuberance. The cross-sectional area and height of the wedge-shaped part increase in the direction of movement of the mixture. The wedge-shaped part has a preferably triangular cross-section with one of the angles of the triangle facing upwards and extends a shorter or longer distance towards the discharge edge of the vibrating trough and, for certain applications, right up to this edge. In other applications and especially where the layer of material from the vibrating trough is to be divided into more than two flows, the discharge edge of the vibrating trough is provided with a number of secondary edges, each of which is separated from the others and bounded by vertically arranged limiting walls. These walls consist in certain applications of wedge-shaped parts similar to those previously described.

In one embodiment, in which the mixture is divided into three layers of material, the vibrating trough is fitted at its discharge end, henceforth called the front edge, with a centrally situated opening comprising a part of the front edge of the vibrating trough.

The two sides of the opening, which point in the direction of movement of the mixture, change into oblique edges comprising the remaining portion of the front edge of the vibrating trough. By this construction, the width of the layer of material which is thereby divided between the centrally situated opening and between the two oblique edges is reduced as compared with the total width of the vibrating trough. In cases where a larger width is necessary, each of the three layers of material is allowed to pass to a subsequent vibrating trough of its own, each such trough being provided with a protuberance in the manner described above. In the subsequent vibrating troughs, the layers of material are thereby further reduced so that the required spreading of material over the entire width of the vibrating troughs is achieved and the width and thickness requirements of the layers of material are satisfied when they are supplied, for example, to the separating plants.

In cases where the layers of material pass over oblique edges, a reduction of the layer thickness takes place with a corresponding increase for the spreading width which in certain applications may constitute a means of achieving the required spreading width and layer thickness in a layer of material supplied to a separation plant.

BRIEF DESCRIPTION OF THE FIGURES OF THE DRAWING

The invention is described in greater detail with reference to the figures of the drawing, wherein:

FIG. 1b is a section taken on line II—II in FIG. 1a;

FIG. 1c is a section taken on line III—III in FIG. 1a;

FIG. 2a shows a vibrating trough with distributing wedge viewed from above.

FIG. 2b is a section taken on line IV—IV in FIG. 2a;

FIG. 2c is a section taken on line V—V in FIG. 2a;

FIG. 5 shows, viewed from above, a vibrating trough interacting with three vibrating troughs with three separation plants;

FIG. 6c is a section taken on line VII—VII in FIG. 6a.

DETAILED DESCRIPTION

Figure 1A:
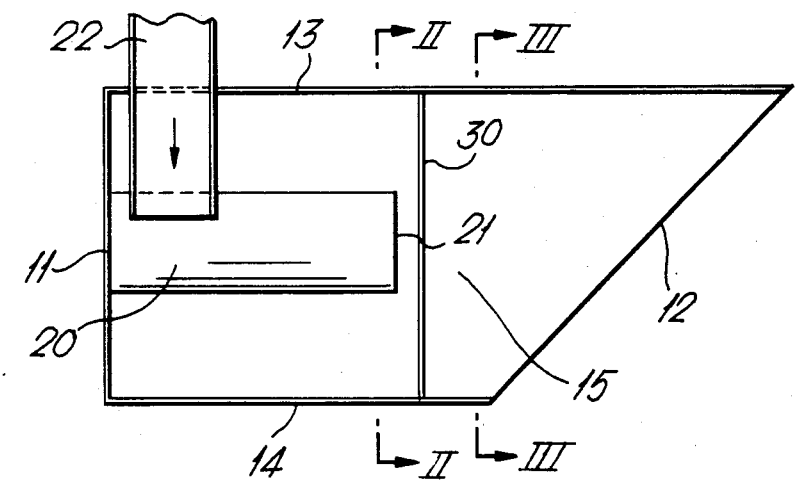
FIG. 1a shows a vibrating trough viewed from above.
Figure 1B:
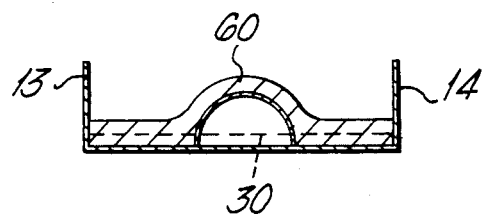
Figure 1C:
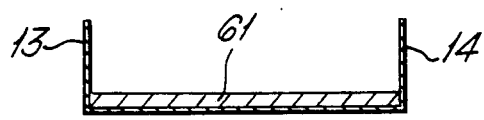

FIGS. 1a–c show a vibrating trough 10 with a rear wall 11 and a front edge 12. In the figures, the front edge forms an angle of about 45° with respect to the longitudinal direction of the vibrating trough. The vibrating trough is further bounded by two walls 13,14 extending upwards from the supporting surface 15 of the vibrating trough and comprising the remaining outer boundaries of the trough. At the rear portion of the vibrating trough and arranged centrally at the supporting surface is a protuberance 20 extending from the rear wall 11 to the front edge 12 of the vibrating trough. The protuberance terminates before it reaches the edge 12. The protuberance has a ridge-like shape the bounding surface of which joins the plane of the vibrating trough and the cross-section of which is curved, preferably part of the circumference of a circle (cf. FIG. 1b). In the direction of the front edge the protuberance terminates in a substantially vertically oriented surface 21. At the vertical surface and slightly after it, in the direction of movement of the material, the supporting surface 15 of the vibrating trough is fitted with a relatively low protrusion 30 extending between the two walls 13,14 of the vibrating trough. The height of the protrusions amounts to a maximum of 1/5 of the height of the protuberance. A feed unit 22 is arranged at the rear end of the vibrating trough. FIGS. 1b–c show layers 60,61 of the mixture which flows during the movement of the mixture towards the front edge of the vibrating trough.

Figure 3:
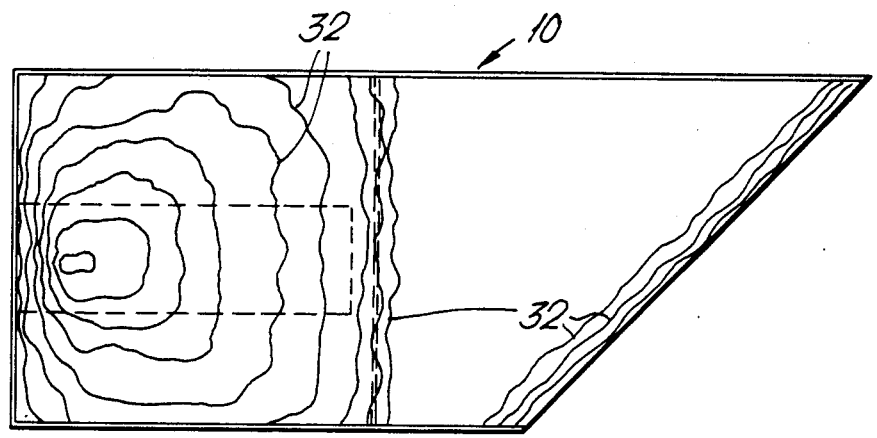
FIG. 3 shows the spread pattern of the mixture on the vibrating trough.

Through feed unit 22 the rear portion of the vibrating trough is supplied with the mixture so that it drops onto protuberance 20. The layer of material is thus formed ground the protuberance the constituents of which primarily slide down from the centre of the vibrating trough and are in addition successively carried towards the two walls 13,14 of the vibrating trough by the motion of the vibrating trough at the same time as the material moves towards the front edge 12. In the introductory portion of the description this sequence has been described in detail. The resultant spread pattern of the material is shown in FIG. 3. In FIG. 3 are level lines 32 which show the thickness of the layer of material at different points on the vibrating trough. It is seen that beside the protrusion 30 and the vertically oriented surface 21 the mixture forms a largely uniformly thick layer 60 (cf. also FIG. 1b) which is carried along by the motion of the vibrating trough towards the front edge 12 of the vibrating trough. From the edge 12 the mixture is discharged to a separation plant, for example.

In certain applications a number of protrusions are arranged one after the other, particularly when equalization of a varying flow rate is especially pronounced.

In FIGS. 2a–c, the protrusions 30a–b are arranged immediately adjacent to the vertical surface 21. Furthermore, the vibrating trough 10' is fitted with a wedge-shaped part 40 the upper edge 41 of which is connected to the highest portion of the protuberance 20. The cross-sectional area of the wedge-shaped part increases as it approaches the front edge 12 of the vibrating trough, i.e. in the direction of movement of the mixture. In a preferred embodiment, the wedge-shaped part has, as is shown in the figures, a triangular cross-section with one of the angles of the triangle pointing upwards.

In FIGS. 2a–c, the wedge-shaped part 40 extends from the protuberance 20 to the front edge 12 of the vibrating trough. In certain embodiments a shorter wedge-shaped part is preferred. Important for reliable operation of the wedge-shaped part is that its upper edge 41 rises comparatively steeply in the direction of movement of the material. An angle of about 30° between the edge 41 and the supporting surface 15 is a frequently-used value.

The wedge-shaped part divides the mixture into two equally large flows of material as the mixture is carried towards the front edge 12 of the vibrating trough.

The wedge-shaped part 40 described with reference to FIGS. 2a–c may appear to counteract the purpose of the invention, i.e. to achieve a uniformly thick layer of the mixture which is discharged at the front edge of the vibrating trough. In practice, however, vibrating troughs with a wedge-shaped part 40 are normally used only when the vibrating trough is followed in the direction of movement of the material by a number of vibrating troughs designed in principle as shown in FIGS. 1a–c. The wedge-shaped part thereby comprises a means of dividing the flow into two sub-flows of largely equal size. The need to bring about such a division arises when the flow of material in the vibrating trough is so great that it exceeds the capacity of the subsequent equipment, such as a separation plant.

Figure 4:
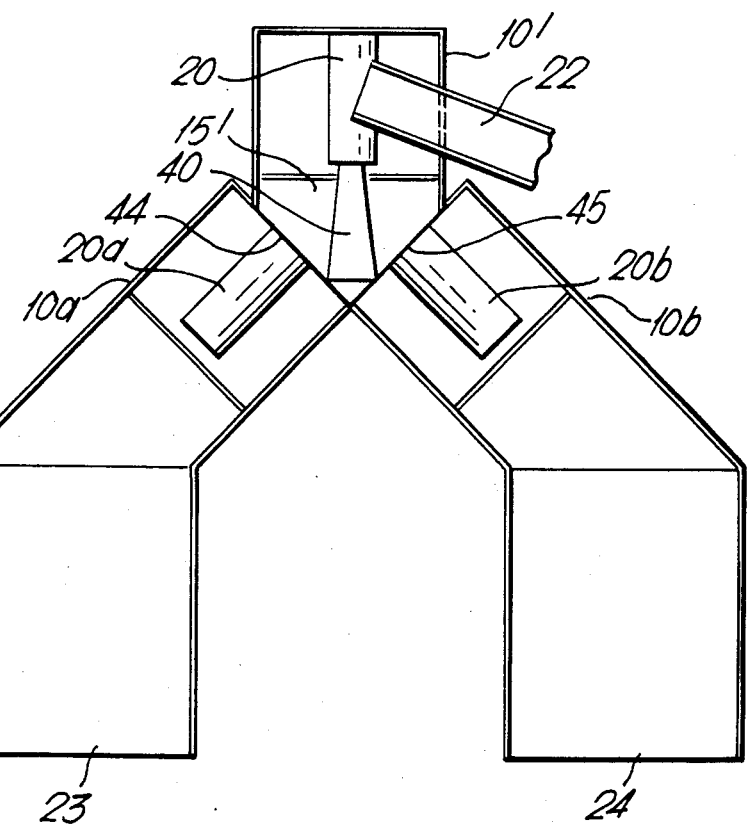
FIG. 4 shows, viewed from above, a vibrating trough with separating wedge interacting with two additional vibrating troughs for distributing refuse to two separation plants.

FIG. 4 shows a device consisting of three vibrating troughs 10', 10a and 10b followed by two plants 23,24. The first vibrating trough 10' is provided with protuberance 20 and wedge-shaped part 40. The two subsequent vibrating troughs 10a,b are also each provided with protuberances 20a,b but no wedge-shaped part. The two vibrating troughs 10a,b are followed by plants 23,24 which comprise separating tables, for example, for sorting the material into a number of different fractions. From FIG. 4, it can be seen how in the transitions between the vibrating troughs on the one hand, and between the vibrating troughs and the subsequent plants on the other hand, the front edge of the respective vibrating troughs forms an angle of about 45° with respect to the direction of movement of the mixtures, whereby the respective subsequent plants 23,24 are supplied with their proportion of the mixture over a greater width. The front edge of the first vibrating trough 10' consists of two oblique edges 44,45 which form an angle of about 90° to each other, whereby the supporting surface 15' at the front part of the vibrating trough is given a pointed shape. Also shown in FIG. 4 is feed unit 22 for supplying the mixture to the first vibrating trough 10'.

From the feed unit 22, the mixture is supplied to the first vibrating trough 10' beside its rear edge and in the area where the protuberance 20 of the vibrating trough is situated. Through the motion of the vibrating trough the mixture is carried towards the front edge of the vibrating trough. On passing the area beside the end of the protuberance the mixture is spread into a comparatively uniformly thick layer. The wedge-shaped part 40 divides the mixture into two subflows, one for the vibrating trough 10a and the other for the vibrating trough 10b. The sub-flows are supplied to the two latter vibrating troughs at the protuberance of the respective vibrating trough. The mixture is then carried towards the front edges of these latter two vibrating troughs and is simultaneously spread out over the supporting surfaces of the two vibrating troughs so that when the mixtures are supplied to the subsequent plants 23,24 they form a uniformly thick layer.

FIG. 5 shows a device consisting of four vibrating troughs 10", 10c–e for dividing the incoming mixture into three equally large sub-flows, each sub-flow consisting of a uniformly thick layer. In this application the first vibrating trough 10" is somewhat modified at its front edge, i.e. at its discharge end. It is there provided with a centrally situated opening 33 which has two of its edges pointing mainly in the direction of movement of the mixture. Arranged at these edges are distributing units 43, which are preferably wedge-shaped. The remaining portions 34,35 of the front edge of the vibrating trough preferably form an angle of 45° with respect to the direction of movement of the mixture. At the front edge of the vibrating trough 10" are arranged three vibrating troughs 10c–e where two of the vibrating troughs 10c and 10e form an angle of about 45° relative to the vibrating trough 10" while the direction of vibrating trough 10d is the same as that of vibrating trough 10". All vibrating troughs 10" and 10c–e have protuberances 20,20c–e arranged as shown in FIGS. 1a–c. Subsequent equipment, not shown in the figure, is arranged at the front edges 12c–e of the respective vibrating troughs 10c–e for further processing of the mixtures. Feed unit 22 is arranged close to the rear wall of the vibrating trough 10".

From feed unit 22 the mixture is supplied to the vibrating trough 10" where it is evenly spread over the supporting surface of the vibrating trough as described earlier so that the mixture forms a uniformly thick layer when it reaches the front edge of the vibrating trough. There the layer is divided into three sub-flows, each of which is supplied to its own vibrating trough 10c–e at the rear wall of the respective vibrating trough. These sub-mixtures are thereby concentrated within a comparatively small area at the rear wall of the respective vibrating troughs where the protuberance of the respective vibrating troughs is situated. From here the sub-mixtures are spread out in the manner described earlier over the entire supporting surface of the respective vibrating troughs as they are simultaneously carried towards the front edge of the respective vibrating troughs where the respective sub-layer is transferred in a uniformly thick layer to the subsequent equipment.

Figure 6A:
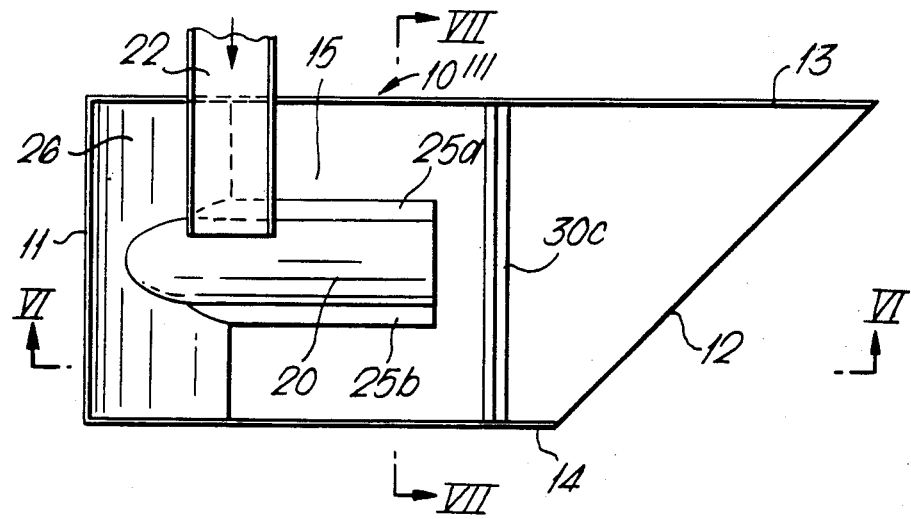
FIG. 6a shows an alternative embodiment of the vibrating trough viewed from above.
Figure 6B:
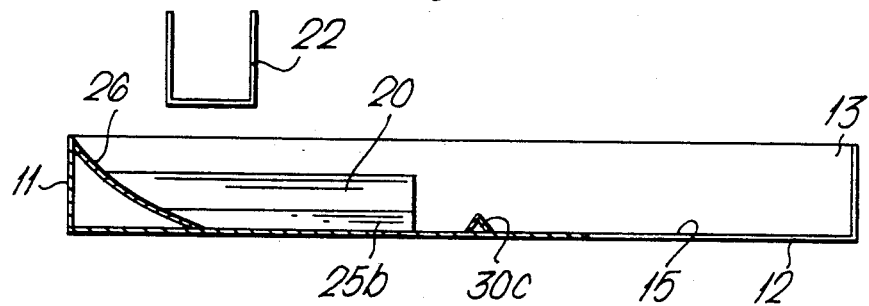
FIG. 6b is a section taken on line VI—VI in FIG. 6.
Figure 6C:
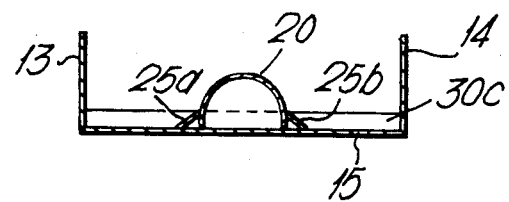

FIGS. 6a–c show an alternative embodiment of vibrating trough 10'''. In this embodiment, the rear portion of the vibrating trough, i.e. its feed portion, is provided with a sloping, preferably curved, upwardly concave surface 26 which joins the protuberance 20 and also the supporting surface 15 of the vibrating trough. Also arranged in the transition between the protuberance 20 and the supporting surface 15 are equalization surfaces 25a–b. Protrusion 30c has a mainly triangular cross-section. Other reference numbers in the figures correspond directly to the earlier description.

By the curved surface 26 the material is prevented from accumulating at the rear wall 11 of the vibrating trough since the material slides along the surface towards the front edge of the vibrating trough. The equalization surfaces 25 fulfill a corresponding function in the transition between the protuberance 20 and the supporting surface 15. The design of the protrusion 30c shown also prevents the accumulation of material. The special units which are clarified with reference to FIGS. 6a–c accordingly constitute practical improvements in the invention. The units help to further reduce the mass of the mixture which is carried along in the vibrating trough and thereby help to reduce the mass forces which occur as a result of the motion of the vibrating trough.

What is claimed is:

1. A device for receiving and discharging a flow of material consisting of a mixture of pieces of material or fragments of different materials and sizes, said device comprising a vibrating trough including opposite side walls and having a supporting surface with an inlet end for supply of material and a discharge end for discharged of said material as a thick layer, said vibrating trough including protuberance means extending on said supporting surface longitudinally between said side walls, supply means for depositing the material from above onto said protuberance means, said protuberance means transporting the supplied material thereon lengthwise of said trough as said trough vibrates while spreading said supplied material onto said supporting surface such that at the end of the protuberance means the material is formed into a uniformly thick layer which is carried along the supporting surface to said discharge end of the vibrating trough for discharge thereat, said supporting surface being substantially flat and said protuberance means comprising a protuberance extending to a height above the flat supporting surface and having a substantially uniform cross-section over its length to divide the trough into two zones on opposite sides of the protuberance to constitute flow sections for the layer of material bounded laterally on one side by the protuberance, on the other side by a respective side wall and on the bottom by the flat supporting surface such that material deposited on the protuberance spreads out by flowing from the protuberance laterally into the flow sections in said zones and longitudinally therealong to the discharge end, said protuberance being elongated and extending with its substantially uniform cross-section axially along said supporting surface for a portion of the length thereof so as to be spaced from said discharge end so that the material flowing in said zones is combined downstream of the protuberance, said discharge end of said trough having a discharge edge formed by an oblique edge of the flat supporting surface which extends at an oblique angle with respect to the axis of said protuberance and the material is discharged at said discharge end in the form of said uniformly thick layer.

2. A device as claimed in claim 1 wherein said protuberance is situated centrally in said trough at said inlet end.

3. A device as claimed in claim 1 wherein said protuberance has a ridge-like shape which is curved in transverse cross-section.

4. A device as claimed in claim 3 wherein said protuberance has a part-circular cross-section.

5. A device as claimed in claim 3 wherein said protuberance has a vertical terminal edge.

6. A device as claimed in claim 5 wherein said side walls are vertical side walls, and a protrusion extending from said side walls at right angles to the direction of flow of the material adjacent to said vertical terminal edge.

7. A device as claimed in claim 6 wherein said protrusion is slightly downstream of said vertical terminal edge in the direction of flow of the material.

8. A device as claimed in claim 6 wherein said protrusion has a height which is a maximum of 1/5 of the height of the protuberance.

9. A device as claimed in claim 1 further comprising means in said trough at said inlet end for preventing rearward flow of material in a direction away from said discharge end and consequent accumulation of material.

10. A device as claimed in claim 9 wherein said means for preventing rearward flow of material comprises a member in said trough having a sloping surface for directing the material supplied to the trough towards said discharge end.

11. A device as claimed in claim 10 wherein said sloping surface is curved concave upwardly.

12. A device as claimed in claim 1 wherein said trough further includes a wedge-shaped part in extension of said protuberance in the direction of flow of said material, said wedge-shaped part having a height and cross-sectional area which increase in the direction of flow of said material for dividing the material into two separate portions of substantially equal amounts.

13. A device as claimed in claim 12 wherein said wedge-shaped part has a substantially triangular cross-section with one of the angles of the triangle facing upwards.

14. An assembly of three vibrating troughs as claimed in claim 1 wherein a first of said troughs transfers substantially equal flows of material to the second and third of said troughs, said first trough having two oblique edges at said discharge end forming an angle with respect to one another such that said supporting surface of said first trough has a pointed shape at said discharge end and substantially equal flows of material pass over said oblique edges, the inlet ends of said second and third troughs being adjacent said oblique edges of said first trough for respectively receiving said equal flows of material and spreading the same over the respective supporting surfaces for discharge from the respective discharge ends.

15. An assembly of four vibrating troughs as claimed in claim 1 wherein a first of said troughs transfers substantially equal flows of material to the second, third and fourth of said troughs, said first trough having a central opening at said discharge end and two oblique edges extending from said opening such that one flow of material passes through said opening to said second trough while second and third flows of material respectively pass over said oblique edges to said third and fourth troughs, said second, third and fourth troughs spreading the respective supplies of material over their respective supporting surfaces for discharge from the respective discharge ends thereof 16. A device as claimed in claim 1 further comprising a transverse protrusion on said supporting surface between said protuberance and said discharge edge.

17. A device as claimed in claim 16 wherein said protrusion extends a portion of the height of said protuberance from said supporting surface.

18. A device as claimed in claim 1 wherein said supply means extends transversely of the protuberance and has an outlet disposed above the protuberance to feed the material laterally onto the protuberance and not directly onto the flat supporting surface.

19. A device as claimed in claim 18 wherein said protuberance is disposed substantially centrally in the trough and said flat supporting surface extends from the protuberance to said side walls.

* * * * *